3,188,342
3-(ARYLTHIO)ALKENENITRILES
Samuel Allen Heininger, St. Louis, and Gail H. Birum, Kirkwood, Mo., assignors to Monsanto Company, a corporation of Delaware
No Drawing. Filed May 28, 1962, Ser. No. 197,897
6 Claims. (Cl. 260—465)

This invention relates to new and useful compounds which are 3-(arylthio)alkenenitriles, and this application is a continuation-in-part of application Serial No. 861,455, filed December 23, 1959, now abandoned.

The novel compounds of the invention are compounds of the formula

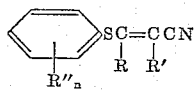

wherein R and R' are hydrogen or hydrocarbon radicals free of aliphatic unsaturation and containing from 1 to 6 carbon atoms, provided that only 1 of R and R' are hydrocarbon radicals. The term "free of aliphatic unsaturation" includes aryl, alkyl, and cycloalkyl radicals only, and by the term "free of aliphatic unsaturation" olefinic and acetylenic unsaturation are excluded. R" is a lower alkyl radical, i.e., contains from 1 to 6 carbon atoms, and is preferably a methyl radical; and $n$ is an integer from 0 to 5. An examination of the formula above will indicate that the compounds can exist in both cis- and trans-isomeric forms. It is intended that both the cis- and trans-forms be covered by the above formula.

It is an object of this invention to provide new and useful compounds.

It is another object of this invention to provide new compounds useful as intermediates for the production of other compounds.

It is another object of this invention to provide new biological toxicants.

These and other objects of the invention will become apparent as the detailed description of the invention proceeds.

There are shown below a number of specific new compounds of the invention. It is not intended that this be a complete listing of all of the compounds of the invention but that it merely be illustrative thereof:

3-(phenylthio)acrylonitrile,
3-(4-tolylthio)acrylonitrile,
3-(3-tolylthio)acrylonitrile,
3-(2-tolylthio)acrylonitrile,
3-(2,3-xylylthio)acrylonitrile,
3-(2,4-xylylthio)acrylonitrile,
3-(2,5-xylylthio)acrylonitrile,
3-(2,6-xylylthio)acrylonitrile,
3-(3,4-xylylthio)acrylonitrile,
3-(3,5-xylylthio)acrylonitrile,
3-(3,4,5-trimethylphenylthio)acrylonitrile,
3-(2,3,4,6-tetramethylphenylthio)acrylonitrile,
3-(pentamethylphenylthio)acrylonitrile,
3-(4-ethylphenylthio)acrylonitrile,
3-(4-n-propylphenylthio)acrylonitrile,
3-(4-isopropylphenylthio)acrylonitrile,
3-(4-n-butylphenylthio)acrylonitrile,
3-(4-isobutylphenylthio)acrylonitrile,
3-(4-t-butylphenylthio)acrylonitrile,
3-(4-n-amylphenylthio)acrylonitrile,
3-(2-n-hexylphenylthio)acrylonitrile, etc.

Referring now to the general formula above of the inventive compound where R and R' are other than hydrogen, the following non-limiting list exemplary of compounds in which R and R' can be methyl, phenyl, ethyl, etc., is provided: 3-(phenylthio)crotononitrile, 3-(4-tolylthio)-cinnamonitrile, 3-(phenylthio)-2-ethylacrylonitrile, 3-(3-tolythio)-2-methacrylonitrile, 3-(2-tolythio)-2-cyclohexylacrylonitrile, etc.

The 3-(naphthylthio)acrylonitriles, e.g., 3-(β-naphthylthio)acrylonitrile, are prepared in a similar manner as the monocyclic compounds described above.

The novel compounds of the invention are normally prepared by dehydrohalogenation of the corresponding 3-(arylthio)-2-haloalkanenitriles. The preparation of the 3-(arylthio)-2-haloalkanenitriles is described in detail in copending application S. N. 641,475, filed February 21, 1957, now U.S. 2,919,224. These 3-(arylthio)-2-haloalkanenitriles can be readily prepared by a variety of methods including the addition of arylsulfenyl chlorides or bromides to acrylonitrile or similar nitriles to give mixtures of the corresponding 3- or 2-halo-2- or 3-(arylthio)propionitriles. Another method of preparing these compounds is by the addition of thiophenols to α-haloacrylonitriles to give 2-halo-3-(arylthio)propionitriles. Still another method of preparation is by the reaction of e.g. sodium or potassium thiophenates with 2,3-dichloropropionitrile. Other methods of preparation of these 3-(arylthio)-2-haloalkanenitrile may be obvious to those skilled in the art in view of the teachings herein. The dehydrohalogenation is accomplished by employment of a basic reacting material such as a trialkylamine, e.g. triethylamine, sodium or potassium hydroxide, pyridine, etc., to aid the dehydrohalogenation.

The invention will be more clearly understood from the following detailed description of specific examples thereof.

*Example 1*

This example illustrates the preparation of 3-(phenylthio)acrylonitrile.

The intermediate product 3-(phenylthio)-2-chloropropionitrile can be prepared by the choline-catalyzed addition of thiophenol to α-chloroacrylonitrile to give an 85% yield, B.P. 115°–116° C./0.3 mm., $n_D^{25}$ 1.5762. An elemental analysis of this intermediate product gave the following results:

| Percent | Found | Calc'd for $C_9H_8ClNS$ |
|---|---|---|
| C | 55.3 | 54.7 |
| H | 4.1 | 4.1 |
| Cl | 17.4 | 18.0 |
| N | 6.7 | 7.1 |
| S | 16.8 | 16.2 |

A 39.4 g. (0.2 m.) portion of 3-(phenylthio)-2-chloropropionitrile was placed in a 600 ml. beaker, and 200 ml. of ether was added, followed by the addition of 40.4 g. of triethylamine. This mixture was warmed on a steam bath and then filtered to remove a precipitate of amine hydrochloride. The filtrate was warmed until all of the ether had evaporated, 20 ml. more of triethylamine was added, more ether was then added, the mixture was filtered, and the ether was evaporated. This process of adding the additional triethylamine, etc., was repeated four additional times. The filtrate from the last treatment was poured into 1 liter of hexane and the solution heated to boiling to remove the ether. Sodium sulfate and charcoal were added to dry and decolorize the crude product solution and this mixture was heated for 10 minutes on a steam bath. The mixture was then filtered through "Supercel," the hexane was distilled off and then the product was distilled twice to give 8.8 g. of liquid product (1) B.P. 95–103° C./0.1 mm., $n_D^{25}$ 1.6077, and 15.3 g. of yellow liquid product (2) B.P. 103–105° C./0.1 mm., $n_D^{25}$ 1.6151. Samples of (1) and (2) were submitted for molecular weight, infrared analysis and percent carbon, hydrogen, nitrogen and sulfur analysis. The results of these analyses were as follows:

|  | Percent C | Percent H | Percent N | Percent S | Molecular Wt. |
|---|---|---|---|---|---|
| Calc'd for C₉H₇NS | 67.10 | 4.37 | 8.68 | 19.87 | 161.20 |
| Found (1) | 67.22 | 4.92 | 8.46 | 19.48 | 162±3% |
| Found (2) | 66.81 | 4.72 | 8.07 | 19.61 | 162±3% |

The molecular weight was determined by (Mechrolab) Vapor Pressure Osmometer using benzene as solvent. Infrared spectra for both (1) and (2) show peaks at 2220 cm.⁻¹ which is characteristic of the —CN group with alpha, beta-unsaturation. The spectra were essentially identical. The good agreement of elemental analysis, molecular weight and infrared spectra of (1) and (2) demonstrate that these compounds have the structure of

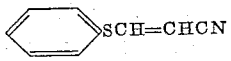

but are apparently mixtures of cis-trans-isomers as indicated by a variation boiling points and refractive indices.

*Example 2*

This example illustrates the preparation of 3-(4-tolylthio)acrylonitrile.

To a 1-liter flask was added 27.8 g. (0.695 mole) of sodium hydroxide in 400 ml. of water and 100 g. (0.8 mole) of 4-toluenethiol. With cooling and stirring to keep the temperature of the reactant below 30°–35° C., 86 g. (0.695 mole) of 2,3-dichloropropionitrile was added. After stirring the mixture for about 3 hours, a yellow oily layer separated out. The reaction mixture was allowed to stand overnight. The next day the reaction mixture was extracted with ether and the ether layer washed once with water, dried over sodium sulfate and distilled, first removing the ether solvent, then collecting:

I. B.P. 46°–47° C./1.5 mm., 22.5 grams of excess toluenethiol.

II. B.P. 141°–144° C./1.2 mm., 23.5 grams, $n_D^{25}$ 1.5668 fairly pure product slightly contaminated with toluenethiol.

III. B.P. 141°–144° C./1.2 mm., 104.1 grams, $n_D^{25}$ 1.5680, product.

Residue 19 grams.

Conversion was 86.7% based on 0.695 moles of the 2,3-dichloropropionitrile. An elemental analysis of the product yield the following information:

| Percent | Found | Calc'd for C₁₀H₁₀ClNS |
|---|---|---|
| C | 57.5 | 56.8 |
| H | 4.8 | 4.8 |
| N | 6.8 | 6.6 |
| Cl | 14.1 | 16.8 |
| S | 15.7 | 15.2 |

This intermediate product is 3-(4-tolythio)-2-chloropropionitrile.

This describes the dehydrochlorination of the intermediate product whose preparation is described in the paragraph immediately above. In a beaker there is placed 21.1 g. (0.1 mole) of 3-(4-tolylthio)-2-chloropropionitrile prepared as described above. To the beaker is added 100 ml. of ether to dissolve the solid product therein, and 20.2 grams of triethylamine is added. This solution is heated on a steam bath and if precipitate forms it is removed by filtration. The heating is continued until all of the ether is driven off. Then to the ether-free solution is added an additional 10 ml. of triethylamine, a solid precipitate forms, ether is added to dilute the slurry, the slurry is filtered to remove the solid matter and the ether is again evaporated from the filtrate. This process of adding the 10 ml. of triethylamine, adding ether to dilute the slurry formed, removing the precipitate by filtration and evaporating the ether from the filtrate is repeated four additional times to ensure the substantially complete dehydrochlorination of the intermediate product. The filtrate from the last triethylamine treatment is added to 500 ml. of hexane and the solution is heated to boiling to drive out the ether. Then sodium sulfate and charcoal are added to the ether-free solution for decolorization and the mixture is heated for a few minutes on a steam bath. Next the mixture is filtered through "Supercel" to give a clear solution. The hexane is evaporated from the filtrate and the product is purified by distillation under high vacuum. An alternative method of recovering and purifying the product is by crystallization.

*Example 3*

This example describes the preparation of a mixture of 3-(tolylthio)acrylonitrile isomers.

In a one liter flask was placed 124 g. (1 mole) of a mixture of thiocresol isomers predominately meta. To this flask was then added 40 g. (1.0 mole) of sodium hydroxide in 400 ml. of water with cooling and stirring to keep the temperature down. To the stirred solution in the flask was gradually added 123.7 g. (1.0 mole) of 2,3-dichloropropionitrile over a period of about ½ to ¾ hour, using external cooling to keep the temperature below about 40° C. The reaction mixture was stirred for two additional hours after which time the reaction mixture was extracted with ether. The ether layer was washed with water and then dried. After the drying step the ether was removed under reduced pressure. The resulting residual product was a red liquid, $n_D^{25}$ 1.5702, weight 199 grams. This represents a 94% yield of 3-(tolylthio)-2-chloropropionitrile isomers intermediate product.

This describes the dehydrochlorination of the intermediate product whose preparation is described in the paragraph immediately above. In a beaker there is placed 21.1 g. (0.1 mole) of the mixed 3-(tolylthio-2-chloropropionitrile isomers prepared as described above. To the beaker is added 100 ml. of ether to dissolve the solid product therein, and 20.2 g. of triethylamine is added. The solution is then heated on a steam bath and any precipitate that forms is removed by filtration. Heating on the steam bath is continued until all the ether is driven off. Then an additional 10 ml. of triethylamine is added, a solid precipitate forms, ether is added to dilute the slurry, the slurry is filtered to remove the solid matter and the ether is evaporated from the filtrate. This process of adding 10 ml. of triethylamine, adding ether, filtering out the precipitate and evaporating the ether from the filtrate is repeated four additional times to ensure the substantially complete dehydrochlorination of the intermediate product. The filtrate from the last triethylamine treatment process is poured into 500 ml. of hexane and heated to boiling to drive out the ether. Then sodium sulfate and charcoal are added to the ether-free solution for decolorization and the mixture is heated a few minutes on a steam bath. The mixture is then filtered through "Supercel" to give a clear hexane solution. The product is recovered from the hexane solution by evaporation of the hexane and is purified by distillation under high vacuum. An alternative method of purification and recovery is by crystallization.

*Example 4*

This example describes the preparation of a mixture of 3-(tolylthio)acrylonitrile and 3-(xylylthio)acrylonitrile isomers.

In a one liter flask was placed 138 g. (1.0 mole based on a xylenethiol) of a mixture of toluenethiols and xylenethiols having a boiling range of 85°–134.5° C./50 mm. of Hg. With cooling and stirring to keep the flask contents below 40° C., 40 g. (1.0 mole) of sodium hydroxide in 400 ml. of water was added to the flask. The flask contents were cooled to 25° C., and over a period of 1 hour 123.9 g. (1.0 mole) of 2,3-dichloropropionitrile was added to the flask with cooling to remove the exothermic heat of reaction and keep the flask contents at a temperature between 25° and 30° C. After the dichloropropionitrile had all been added to the flask, stirring was continued for 1 additional hour at room temperature. The reaction mixture was extracted with ether, the ether layer washed once with water, dried over sodium sulfate and the ether distilled off under vacuum. The residual product was an orange oil weighing 205 g., $n_D^{25}$ 1.5706. This intermediate product was a mixture of 3-(tolylthio)-2-chloropropionitriles and 3-(xylylthio)-2-chloropropionitriles. The theoretical yield based on a molecular weight of 138 for a xylenethiol was 226 grams. On this basis the yield from the reaction was 91%.

This describes the dehydrochlorination of the intermediate product whose preparation is described in the paragraph immediately above. In a beaker there is placed 22.5 g. (0.1 mole based on a molecular weight of 225) of the intermediate product prepared as described above. To the beaker is added 100 ml. of ether to dissolve the solid product therein, and 20.2 g. of triethylamine are added. The solution is heated on a steam bath and if precipitate forms it is removed by filtration. Heating is continued until all of the ether is driven off. Then an additional 10 ml. of triethylamine is added, solid precipitate forms, ether is added to dilute the slurry, the slurry is filtered to remove the solid matter and the ether is evaporated from the filtrate. This process involving adding 10 ml. of triethylamine, adding ether, removing the precipitate by filtration and evaporating the ether from the filtrate is repeated four additional times to ensure the substantial complete dehydrochlorination of the intermediate product. The filtrate from the last triethylamine treatment is added to 500 ml. of hexane and the solution is heated to boiling to drive out the ether. Then to the ether-free solution is added sodium sulfate and charcoal for decolorization and the mixture is heated a few minutes on the steam bath. The mixture is then filtered through "Supercel" to give a clear hexane solution. The crude product is recovered from the hexane solution by evaporating the hexane and the product is purified by distillation under high vacuum. An alternative method of recovery and purification is by crystallization.

Example 5

This example illustrates the preparation of a mixture of 3-(phenylthio)acrylonitrile and 2-(phenylthio)acrylonitrile.

The sulfide intermediate product, i.e., a mixture of 3-(phenylthio)-2-chloropropionitrile and 2-(phenylthio)-3-chloropropionitrile is made in the following manner: A mixture of 28.9 g. (0.2 mole) of benzenesulfenyl chloride and 10.6 g. (0.2 mole) of acrylonitrile in 100 ml. of glacial acetic acid is refluxed for two hours. The color of the mixture turns from red to yellow during the reaction. Some HCl evolution will normally be observed in carrying out this reaction. After standing overnight at room temperature, the reaction mixture is poured into 500 ml. of water. The oil layer which separates is extracted with a mixture of equal volumes of benzene and hexane and the extract is washed with water until it is free of acid. Then the product is distilled under high vacuum to purify the product. This is the desired intermediate product.

This describes the dehydrochlorination of the intermediate whose preparation is described in the paragraph immediately above. In a beaker there is placed 19.7 g. (0.1 mole) of the mixture of 3-(phenylthio)-2-chloropropionitrile and 2-(phenylthio)-3-chloropropionitrile prepared as described above. To the beaker is added 100 ml. of ether to dissolve the solid product therein, and 20.2 g. of triethylamine are added. The solution is then heated on a steam bath and if precipitate forms it is removed by filtration. Heating is continued until all of the ether is driven off. Then an additional 10 ml. of triethylamine is added, a precipitate is formed, ether is added to dilute the slurry, the slurry is filtered to remove the solid matter and again the ether is evaporated from the filtrate. This process of adding 10 ml. of triethylamine, ether, filtering out the solid matter and evaporating the ether from the filtrate is repeated four additional times to ensure the substantial complete dehydrochlorination of the intermediate product. The filtrate from the last triethylamine treatment is added to 500 ml. of hexane and heated to boiling to drive out the ether. Then to the ether-free solution is added sodium sulfate and charcoal for decolorization and the mixture is heated for a few minutes on the steam bath. The mixture is then filtered through "Supercel" to give a clear hexane solution. The desired product which is a mixture of 3-(phenylthio)acrylonitrile and 2-(phenylthio) acrylonitrile isomers in hexane solution is heated to evaporate the hexane. Then the hexane-free solution is distilled under high vacuum to purify the product. The products can also be purified by crystallization. The isomers cannot be readily separated one from the other by either distillation or crystallization.

Example 6

This is an example of the preparation of 3-(phenylthio)-2-methacrylonitrile.

In a 2-liter flask is placed 220 g. (2.0 moles) of thiophenol, and a solution of 80 g. (2.0 moles) of sodium hydroxide in 800 ml. of water is added while cooling the flask in an ice bath. Then over a period of two hours 276 g. (2 moles) of 2,3-dichloro-2-methylpropionitrile (prepared by the chlorination of methacrylonitrile) is added keeping the temperature at 15°–20° C. by cooling. The reaction mixture is stirred for one hour longer and then allowed to stand overnight. The crude product contained in the organic layer is purified by distillation under high vacuum. Alternatively the product can be purified by crystallization from ethanol. This intermediate product is 3-(phenylthio)-2-chloro-2-methylpropionitrile.

This describes the dehydrochlorination of the intermediate produce whose preparation is described in the paragraph immediately above. In a beaker there is placed 21.1 g. (0.1 mole) of 3-(phenylthio)-2-chloro-2-methylpropionitrile prepared as described above. To the beaker is added 100 ml. of ether to dissolve the product therein, and 20.2 g. of triethylamine are added. The mixture is heated on a steam bath and if any procipitate forms it is removed by filtration. The heating on the steam bath is continued until all of the ether is driven off. Than an additional 10 ml. of triethylamine is added, a solid precipitate forms, ether is added to dilute the slurry, the slurry is filtered to remove the solid matter and the ether is again evaporated from the filtrate. This process of adding 10 ml. of triethylamine, ether, filtering to remove solid matter and evaporation of the ether from the filtrate is repeated four additional times to ensure the substantial complete dehydrochlorination of the intermediate product. The filtrate from the last triethylamine treatment is then poured into 500 ml. of hexane and the solution is heated to boiling to drive out the ether. Then sodium sulfate and charcoal for decolorization are added to the hexane solution and the mixture is heated a few minutes on the steam bath. The mixture is then filtered through "Supercel" to give a clear hexane solution. Then the hexane is removed by evaporation to given a crude produce which is distilled under high vacuum for purification. Alternatively the product can be purified by crystallization from hexane.

The novel compounds of the invention are particularly useful as intermediates for the preparation of the corresponding sulfoxides and sulfones. The sulfoxides are prepared from the novel compounds of the invention by controlled oxidation using $H_2O_2$ in acetic acid or using fuming nitric acid in acetic acid as described in detail in our copending application S.N. 706,239, filed December 31, 1957, now Patent No. 3,000,927. The corresponding sulfones are described in detail in our copending application S.N. 656,200, filed May 1, 1957. These sulfones are prepared from the novel compounds of the invention by oxidation preferably using $H_2O_2$ in acetic acid, which oxidation process is described in detail with relation to arylthio haloalkane nitriles in our copending application S.N. 656,200, filed May 1, 1957. As indicated in these copending applications the sulfoxides and sulfones are particularly valuable biological toxicants.

The novel compounds of the invention are also themselves valuable biological toxicants, being useful as insecticides, herbicides, microbiological toxicants, fungicides, etc. These novel compounds of the invention are especially useful as soil fungicides at concentrations of 100 p.p.m. and less.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:
1. A 3-(arylthio)alkenenitrile of the formula

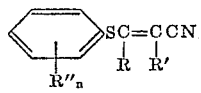

wherein R and R' are selected from the class consisting of hydrogen, saturated hydrocarbon radicals containing from 1 to 6 carbon atoms and the phenyl radical, provided that only one of R and R' is a hydrocarbon radical, R'' is a lower alkyl radical, and $n$ is an integer from 0 to 5.
2. The alkenenitrile of claim 1 wherein R and R' are hydrogen.
3. 3-(xlylthio)acrylonitrile.
4. 3-(tolylthio)acrylonitrile.
5. 3-(4-tolylthio)acrylonitrile.
6. 3-(phenylthio)acrylonitrile.

References Cited by the Examiner
UNITED STATES PATENTS
3,000,927   9/61   Birum et al. _____ 167—30

OTHER REFERENCES
Gundermann, Annalen der chemie, 1954, Band 588, pp. 167–181 (p. 169).
Gundermann et al., Deutsche Chemische Gesellschaft Berichte, 1956, vol. 89, pp. 1263–1270.

CHARLES B. PARKER, *Primary Examiner.*